US012600581B2

(12) United States Patent
Hötger et al.

(10) Patent No.: US 12,600,581 B2
(45) Date of Patent: Apr. 14, 2026

(54) SORTING METHOD AND DEVICE FOR SORTING PLATE-SHAPED OBJECTS, PREFERABLY GLASS PANEL CUT PIECES, METHOD AND DEVICE FOR PRODUCING GLASS PANEL CUT PIECES WITH A SORTING DEVICE OF THIS TYPE

(71) Applicant: HEGLA GmbH & Co. KG, Beverungen (DE)

(72) Inventors: Bernhard Hötger, Lauenförde (DE); Dieter Riepe, Beverungen (DE); Christian Rotermund, Höxter (DE); Markus Schoisswohl, Vienna (AT); Mirko Werneke, Beverungen (DE)

(73) Assignee: HEGLA GmbH & Co. KG, Beverungen (DE)

( * ) Notice: Subject to any disclaimer, the term of this patent is extended or adjusted under 35 U.S.C. 154(b) by 1267 days.

(21) Appl. No.: 17/052,680

(22) PCT Filed: Apr. 4, 2019

(86) PCT No.: PCT/EP2019/058573
§ 371 (c)(1),
(2) Date: Nov. 3, 2020

(87) PCT Pub. No.: WO2019/211058
PCT Pub. Date: Nov. 20, 2019

(65) Prior Publication Data
US 2021/0253371 A1    Aug. 19, 2021

(30) Foreign Application Priority Data

May 4, 2018    (DE) ..................... 10 2018 206 974.3
Jul. 23, 2018    (DE) ..................... 10 2018 117 765.8
Oct. 23, 2018    (DE) ..................... 10 2018 218 141.1

(51) Int. Cl.
*B65G 49/06*    (2006.01)
*B07C 5/36*    (2006.01)
(Continued)

(52) U.S. Cl.
CPC .............. *B65G 49/063* (2013.01); *B07C 5/36* (2013.01); *B65G 47/642* (2013.01);
(Continued)

(58) Field of Classification Search
CPC .. B65G 49/063; B65G 49/067; B65G 49/068; B65G 47/642; B07C 5/36; B07C 2501/0072
(Continued)

(56) References Cited

U.S. PATENT DOCUMENTS 3,995,748 A    12/1976    Looney
5,685,437 A * 11/1997    Lisec ................... B65G 49/062
                                                            211/41.14
(Continued)

FOREIGN PATENT DOCUMENTS

DE    102011106780 A1 *    1/2013    ............... B07C 5/04
DE    102018214131 A1      2/2020
(Continued)

OTHER PUBLICATIONS

Mader; Leopold, "Conveying Apparatus" (English Translation), Jan. 18, 2018, worldwide.espacenet.com (Year: 2018).*
(Continued)

*Primary Examiner* — Molly K Devine
(74) *Attorney, Agent, or Firm* — Greer Burns & Crain Ltd.

(57) ABSTRACT

A sorting method and a sorting device for sorting glass panel cut pieces, as well as a device for producing cut-out glass panels with a cutting system for cutting raw glass panels into individual glass panel cut pieces, and with a sorting device
(Continued)

of this type, as well as a method for producing cut-out glass panels.

35 Claims, 3 Drawing Sheets

(51) Int. Cl.
B65G 47/64 (2006.01)
B66F 9/06 (2006.01)
B66F 9/12 (2006.01)

(52) U.S. Cl.
CPC ......... B65G 49/067 (2013.01); B65G 49/068 (2013.01); B66F 9/063 (2013.01); B66F 9/12 (2013.01); B07C 2501/0072 (2013.01); B65G 2201/022 (2013.01)

(58) Field of Classification Search
USPC ......................................................... 209/539
See application file for complete search history.

(56) References Cited

U.S. PATENT DOCUMENTS

| | | | | |
|---|---|---|---|---|
| 10,870,545 | B2 * | 12/2020 | Lang .................... | B65G 49/067 |
| 2004/0118160 | A1 | 6/2004 | Honegger et al. | |
| 2011/0005903 | A1 * | 1/2011 | Niewiera ............. | B65G 49/068 |
| | | | | 198/791 |
| 2011/0239838 | A1 * | 10/2011 | Nagy ................... | C03B 33/037 |
| | | | | 83/78 |
| 2011/0247914 | A1 * | 10/2011 | Weigl .................. | B65G 49/068 |
| | | | | 198/379 |

FOREIGN PATENT DOCUMENTS

| | | | |
|---|---|---|---|
| EP | 0048334 | A1 | 3/1982 |
| EP | 0620171 | A1 | 10/1994 |
| EP | 1323651 | A2 | 7/2003 |
| EP | 2308782 | A1 | 4/2011 |
| EP | 2543446 | A1 | 1/2013 |
| JP | H0614146 | U | 2/1994 |
| JP | 2008110876 | A | 5/2008 |
| RU | 2574308 | C2 | 2/2016 |
| SU | 712012 | A3 | 1/1980 |
| WO | 9525688 | A1 | 9/1995 |
| WO | 2008041326 | | 4/2008 |
| WO | WO-2018010942 | A1 * | 1/2018 ............. B65G 1/023 |

OTHER PUBLICATIONS

Rueschoff; Gerhard, "Process and Apparatus for Sorting Glass Sheets" (English Translation), Jul. 2, 2003, worldwide.espacenet. com (Year: 2003).*
Zumstein; Ernst, "Apparatus for Sorting Unsorted Glass Plates of A Glass-Cutting Installation" (English Translation), Mar. 31, 1982, worldwide.espacenet.com (Year: 1982).*
Zumstein; Ernst, "Apparatus for Sorting Sheet Material" (English Translation), Oct. 19, 1994, worldwide.espacenet.com (Year: 1994).*
CA 3099011: Office Action issued on Apr. 27, 2022 (4 pages). This Canadian application is a Canadian nationalization of PCT/EP2019/ 058573.
JP 2021-510527: Office Action issued on Mar. 23, 2022— translation (8 pages).
PCT Application No. PCT/EP2019/058573: English Translation of International Preliminary Report on Patentability dated Dec. 2, 2019 (4 pages).
PCT Application No. PCT/EP2019/058573: International Search Report and translation thereof dated Jul. 1, 2019 (6 pages).
RU 2020139286/11 (072962) : Russian Office Action, May 24, 2021, and Statement of Relevance, Search report Apr. 30, 2021 and translation (10 pages).
AU 2019264172: Australian Office Action issued on Nov. 25, 2021 (9 pages).

* cited by examiner

1

SORTING METHOD AND DEVICE FOR SORTING PLATE-SHAPED OBJECTS, PREFERABLY GLASS PANEL CUT PIECES, METHOD AND DEVICE FOR PRODUCING GLASS PANEL CUT PIECES WITH A SORTING DEVICE OF THIS TYPE

The present invention relates to a sorting method and to a sorting device for sorting plate-shaped objects, preferably glass sheet cut pieces, and to a device for producing cut glass sheets having a cutting installation for cutting glass raw sheets into individual glass sheet cut pieces and having such a sorting device, and to a method for producing cut glass sheets.

A sorting device of the type indicated is known e.g. from EP 1 323 651 A1. EP 1 323 651 A1 discloses a sorting device for sorting glass sheet cut pieces, an intermediate storage and sorting device being provided that intermediately stores and sorts the glass sheet cut pieces and that comprises a non-movable intermediate storage unit, and to which the glass sheet cut pieces of a production run can be in particular continuously transferred. In addition, devices are provided into which the glass sheet cut pieces can be introduced, in sorting fashion, from the stationary intermediate storage device. A movable shuttle is situated before the stationary intermediate storage device, and, next to the intermediate storage device, a further movable shuttle is situated opposite the first shuttle.

In addition, EP 1 323 651 A1 discloses a method for sorting glass sheets, the glass sheets of a production run from a processing line being introduced in sorting fashion into storage devices or further processing production lines, an intermediate storage and sorting device being used that is continuously fed with the glass sheet cut pieces of a production run and that introduces the glass sheets, assigning them in sorting fashion, into storage devices or further processing production lines, the intermediate storage and sorting device comprising a plurality of movable intermediate storage units that can be moved into a loading or unloading position independently of one another. The intermediate storage units are moved along a track, in a manner such that in order to overtake a second intermediate storage unit, the intermediate storage units are lifted off the track, in the manner of a paternoster lift, and are moved over the second, or further, intermediate storage unit.

EP 0 620 171 A1 indicates an installation for sorting cut glass panes. The cut glass panes are sorted into harp racks that are situated alongside one another, using a sorting carriage that has two compartments. When the harp racks are full, they are brought into a precisely defined position in front of a transfer device for transferring the glass panes into a further processing installation, for example an insulating glass production line. The glass panes are removed from the compartments in a preprogrammed sequence.

EP 0 048 334 A1 likewise discloses a device for sorting unsorted glass panes of a glass cutting installation. The cut glass panes are introduced into a harp rack in unsorted fashion. Subsequently, the harp rack is brought to a sorting device that comprises a plurality of harp racks situated alongside one another. The sorting device moreover has a movable carriage that receives the harp rack coming from the cutting installation and that can be moved along the row of harp racks. In addition, the movable carriage comprises a transfer device that can be moved along the movable carriage for the transfer of the cut glass panes from the harp rack to the row of harp racks.

WO 95/25688 A1 discloses a method for sorting plates, in particular glass sheet cut pieces, the glass sheet cut pieces being deposited into compartments of a compartmented shelf, and the glass sheet cut pieces subsequently being transferred from the compartmented shelf into a harp rack. The compartment of the harp rack into which the glass sheet cut piece is to be placed can be oriented opposite the compartment of the compartmented shelf in which the glass sheet cut piece is received by moving the harp rack along the compartmented shelf.

The object of the present invention is to provide a sorting device for sorting plate-shaped objects, preferably cut glass sheets, that has a simple and space-saving design and that ensures a simple, rapid, and low-cost sorting.

A further object of the present invention is to provide a simple and low-cost sorting method for sorting the plate-shaped objects, preferably cut glass sheets.

In addition, an object of the present invention is to provide a device for producing cut glass sheets having a cutting installation for cutting glass raw sheets into individual glass sheet cut pieces, and having such a sorting device, and to provide a method for producing cut glass sheets.

These objects are achieved by a sorting device according to claim 1, a sorting method according to claim 18, a device according to claim 26, and a method according to claim 32. Advantageous developments of the present invention are characterized in the respectively following subclaims.

In the following, the present invention is exemplarily described in more detail on the basis of a drawing.

Figure 1:
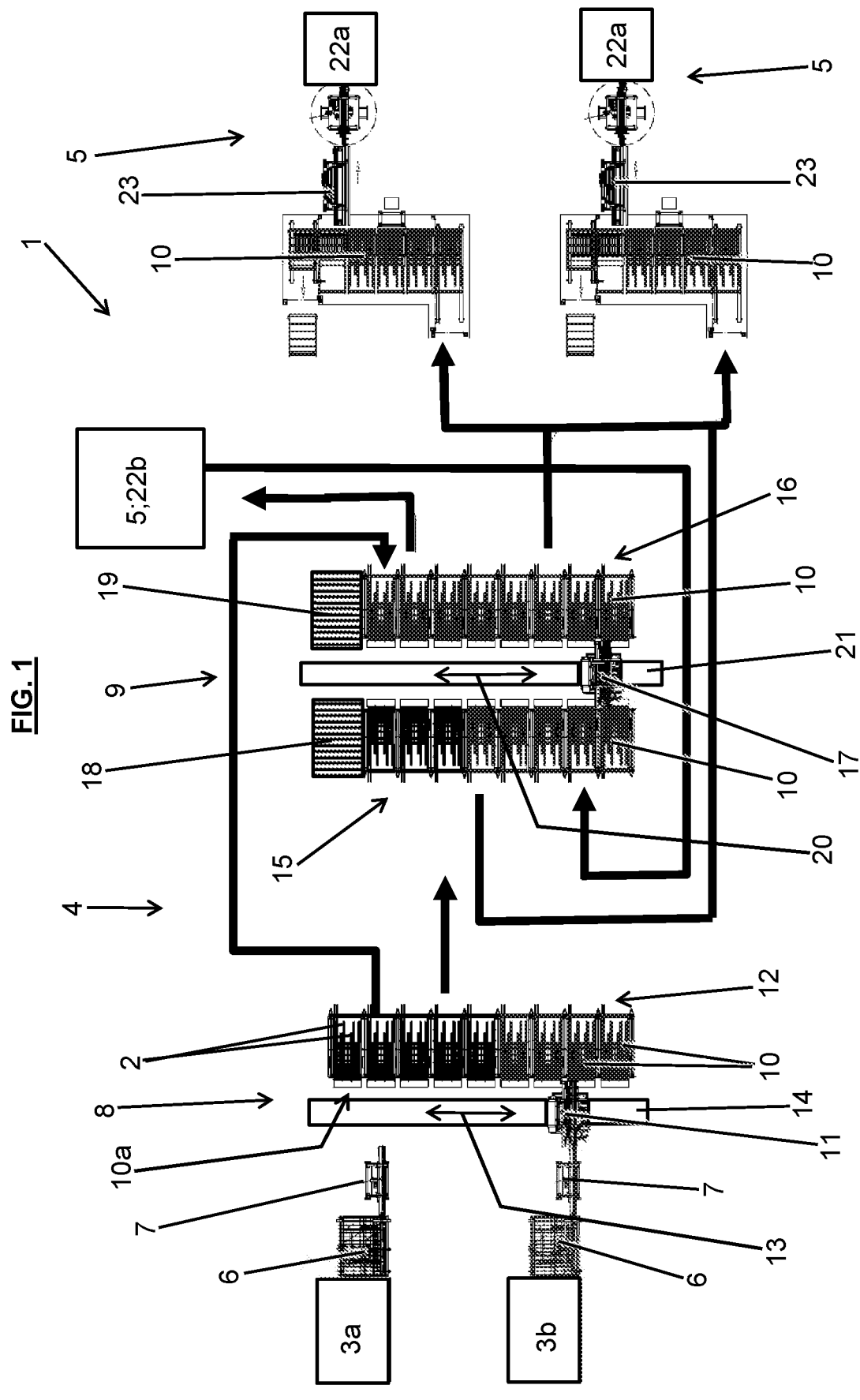
FIG. 1 shows a highly simplified and schematic top view of a device according to the present invention, having two cutting installations and having a sorting device according to the present invention, in a first specific embodiment of the present invention.
Figure 2:
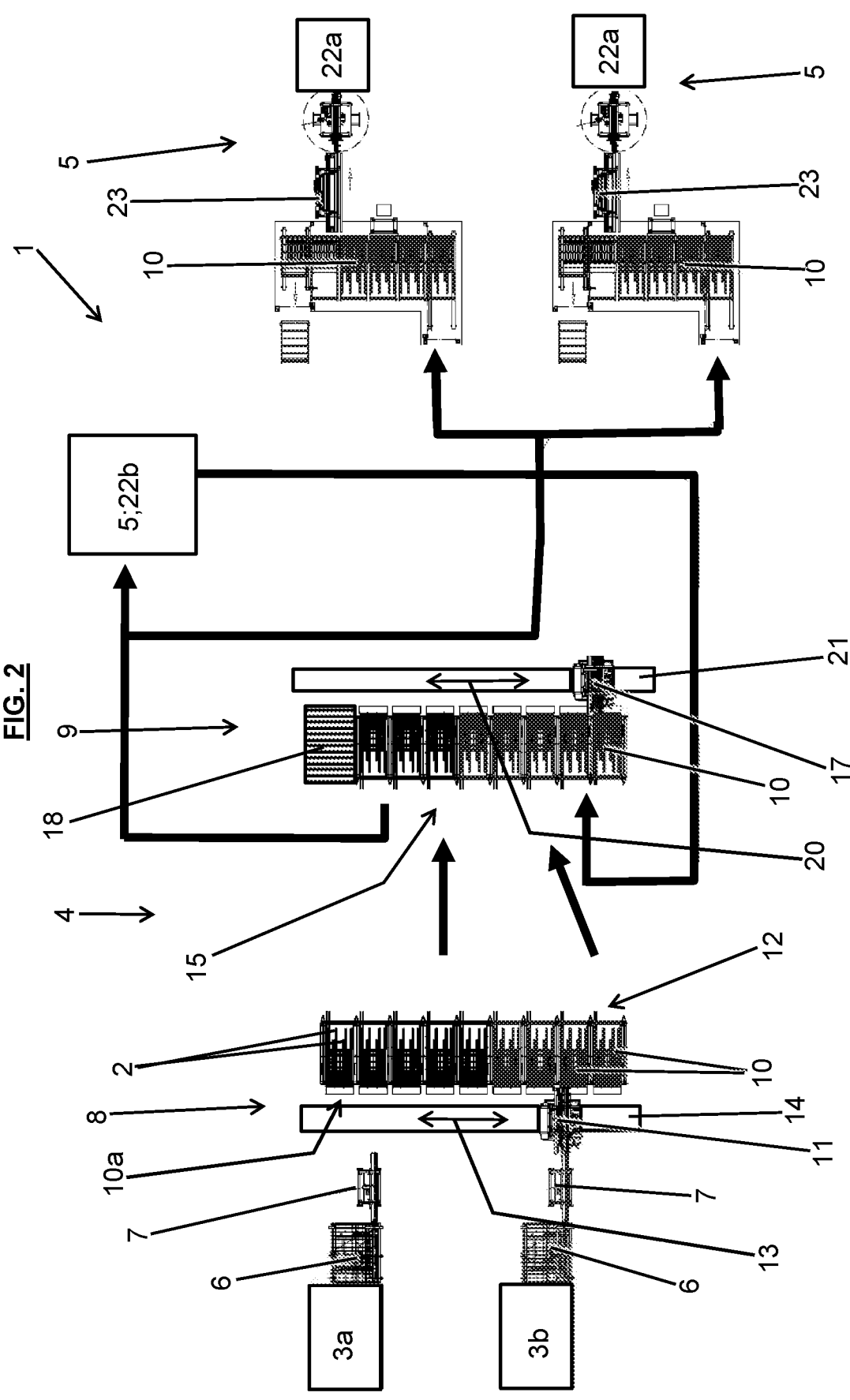
FIG. 2 shows a highly simplified and schematic top view of a device according to the present invention, having two cutting installations and having a sorting device according to the present invention, in a further specific embodiment of the present invention.

Device 1 according to the present invention (FIGS. 1, 2, 3) for producing cut glass sheets, or glass sheet cut pieces 2, comprises at least one known cutting production line or cutting installation 3*a;b*, a sorting device 4 according to the present invention, and at least one further processing installation or further processing production line 5.

Glass sheet cut pieces 2 are preferably made of float glass and/or of laminated glass. They are thus preferably float glass sheet cut pieces and/or laminated glass sheet cut pieces.

As a result, device 1 preferably has a laminated glass cutting installation 3*a* and a float glass cutting installation 3*b*. In cutting installations 3*a;b*, glass raw sheets are divided, in a known manner, into the respective individual glass sheet cut pieces 2.

At the end of the respective cutting installation 3*a;b*, a respective tilting table 6 is provided by which glass sheet cut pieces 2 can be brought from their horizontal position into a vertical position, or a position inclined somewhat relative to the vertical. Tilting table 6 is preferably connected to a conveying means 7. This is preferably a buffer conveyor. Using conveying means 7, an individual glass sheet cut piece 2 is respectively transferred to sorting device 4, or is placed therein. The transfer to sorting device 4 can also however take place directly from tilting table 6.

Sorting device 4 according to the present invention comprises a receiving station 8 and a sorting station 9.

Receiving station 8 comprises a plurality of movable compartmented frames 10 situated alongside one another, and a movable receiving and transfer shuttle 11.

Compartmented frames 10 are used to receive glass sheet cut pieces 2, and for this purpose comprise, in a known manner, a plurality of compartments. In particular, a compartmented frame 10 comprises at least 20 compartments, preferably at least 50 compartments, for receiving, respectively, one or more glass sheet cut pieces 2. In the compartments, glass sheet cut pieces 2 are oriented vertically, or are inclined somewhat relative to the vertical. Compartmented frames 10 can also receive a plurality of glass sheet cut pieces 2, situated one after another, per compartment.

In addition, compartmented frames 10 respectively have an open introduction and removal end 10a at which glass sheet cut pieces 2 can be placed into compartmented frame 10 or removed from it. Compartmented frames 10, situated alongside one another in a compartmented frame row 12, are all situated such that introduction and removal ends 10a are respectively oriented towards receiving and transfer shuttle 11. They are not oriented towards the adjacent compartmented frame 10.

In addition, compartmented frames 10 preferably do not have any conveying means for conveying the glass sheet cut pieces 2 into and out of compartmented frame 10.

Compartmented frames 10 are preferably harp racks. In addition, however, compartmented frames 10 can also be used that are moved by driverless transport vehicles (AGV: Automated Guided Vehicle). Because these compartmented frames 10 do not have wheels, they are significantly lighter than the harp racks. Thus, the harp racks are movable compartmented frames 10 having wheels. In contrast to receiving and transfer shuttle 11, compartmented frames 10, in particular harp racks 10, are each freely movable, i.e. movable not only on predetermined tracks, as in the case of receiving and transfer shuttle 11, but rather movable independently of tracks or rails.

Receiving and transfer shuttle 11 is used to receive glass sheet cut pieces 2 from the respective cutting installation 3a;b, in particular from conveying means 7, and to transfer glass sheet cut pieces 2 to compartmented frames 10.

Receiving and transfer shuttle 11 is positioned before compartmented frame row 12 in the production sequence, or processing sequence. In addition, receiving and transfer shuttle 11 is movable back and forth in automated fashion parallel to horizontal compartmented frame row 12, in a horizontal shuttle conveyor device 13, along a fixedly defined track, preferably on rails 14. Corresponding drive and control means are provided for moving receiving and transfer shuttle 11. Preferably, receiving and transfer shuttle 11 has a drive motor and a control device. The drive motor is preferably a linear motor. However, the drive can also be accomplished using a rotary motor in combination with a rack and pinion. The drive can also take place using a toothed belt and a stationary drive motor. The control device can also be stationary and can be connected to receiving and transfer shuttle 11 in a signal-transmitting manner.

Preferably, receiving and transfer shuttle 11 has one or more grippers with which glass sheet cut pieces 2 can be conveyed from the respective conveyor means 7 onto receiving and transfer shuttle 11, and from receiving and transfer shuttle 11 into compartmented frames 10. Receiving and transfer shuttle 11 can however also have rollers or belts for conveying glass sheet cut pieces 2 into compartmented frames 10, and the reverse.

Receiving and transfer shuttle 11 preferably has only a single compartment, or two compartments (not shown), such that a single glass sheet cut piece 2 or a plurality of glass sheet cut pieces 2 can be received one after another, or in alignment with one another, respectively per compartment. Preferably, however, receiving and transfer shuttle 11 has at most 10, preferably at most 5, compartments. If receiving and transfer shuttle 11 has two glass sheet cut pieces 2 next to one another, which is preferred, then it is a double shuttle. Separate sorting station 9 of sorting device 4 according to the present invention is situated after receiving station 8 in the production sequence, or processing sequence.

According to a first specific embodiment (FIG. 1), sorting station 9 comprises a first compartmented frame row 15, a second compartmented frame row 16, a sorting shuttle 17 situated between them, and preferably at least one stationary storage unit 18 and a second stationary storage unit 19. Second compartmented frame row 16 is situated after first compartmented frame row 15, seen in the production sequence, or processing sequence.

The two horizontal compartmented frame rows 15;16 of sorting device 4 respectively comprise a plurality of movable compartmented frames 10 situated alongside one another. Compartmented frames 10 situated alongside one another in a compartmented frame row 15;16 are here all situated such that the introduction and removal ends 10a are respectively oriented towards sorting shuttle 17. That is, the introduction and removal ends 10a of compartmented frames 10 of the two compartmented frame rows 15:16 are oriented towards one another.

Sorting shuttle 17 is movable back and forth in automated fashion, parallel to the two horizontal compartmented frame rows 15;16 and between them, in a horizontal shuttle conveyor device 20 along a fixedly defined track, preferably on rails 21. Corresponding drive and control means are in turn provided for moving sorting shuttle 17. The drive and the controlling of sorting shuttle 17 take place analogously to that of receiving and transfer shuttle 11.

Preferably, sorting shuttle 17 also has one or more grippers with which glass sheet cut pieces 2 can be sorted from compartmented frames 10 onto sorting shuttle 17 and from sorting shuttle 17 into other compartmented frames 10. However, sorting shuttle 17 can for example also comprise rollers or belts for conveying glass sheet cut pieces 2 into compartmented frames 10, and the reverse.

Sorting shuttle 17 preferably also has only one single compartment, or two compartments (not shown), such that a single glass sheet cut piece 2 or a plurality of glass sheet cut pieces 2 can be accommodated one after another, or in alignment with one another, per compartment.

Preferably, however, sorting shuttle 17 has at most 10, preferably at most 5, compartments. If sorting shuttle has two glass sheet cut pieces 2 next to one another, which is preferred, then it is a double shuttle.

First stationary storage unit 18 is in addition situated at a front or head end of first compartmented frame row 15, and second stationary storage unit 19 is situated at a front or head end of second compartmented frame row 16. The two stationary storage units 18;19 can also be used by sorting shuttle 17.

According to a further specific embodiment (FIG. 2), sorting station 9 comprises only a single compartmented frame row 15.

Preferably, further processing installation 5 is an insulating glass production line 22a for the further processing of glass sheet cut pieces 2 made of insulating glass, or is a tempering device 22b for tempering glass sheet cut pieces 2 made of float glass, or is a device for edge processing.

According to a further specific embodiment of the present invention (FIG. 3), in addition to compartmented frames 10, receiving station 8 comprises at least one stationary storage device 24 for storing glass sheet cut pieces 2. Storage device 24 is situated next to compartmented frame row 12, and is likewise situated adjacent to the track of receiving and transfer shuttle 11, or is situated directly after said track in the processing sequence, so that glass sheet cut pieces 2 can also be introduced by receiving and transfer shuttle 11 into compartmented frame row 12, alternatively to compartmented frames 10. For this purpose, storage device 24 has, in a known manner, a plurality of compartments that are vertical or that are inclined relative to the vertical for receiving glass sheet cut pieces 2.

In addition, a further compartmented frame row 26, having compartmented frames 10 situated alongside one another, is provided after storage device 24, in the processing sequence. And, between storage device 24 and compartmented frame row 26, at least one further sorting shuttle 27, preferably two, is provided that can be moved back and forth in automated fashion along a fixedly defined track, preferably on rails 29. For this purpose, corresponding drive means are provided. Compartmented frame row 26 and further sorting shuttle 27 thus form a further sorting station 30.

In addition, device 1 according to the further specific embodiment preferably has a pre-sorting segment 25 situated before receiving station 8 in the processing sequence. Pre-sorting segment 25 is for example realized as a run-in segment according to German patent application DE 10 2018 214 131.2. It thus has a multi-level, preferably two-level, transport and lifting device, and has a multi-level, preferably two-level, storage segment situated after said device in the processing sequence.

In the transport and lifting device, the glass sheet cut pieces are partially lifted onto the upper level or upper levels of the transport and lifting device. As a result, the transport and lifting device is used for the multi-level, preferably two-level, transport of glass sheet cut pieces 2 in the horizontal direction. The storage segment is also multi-level, preferably two-level, in construction, and has two levels, i.e. storage levels, situated one over the other in which the glass sheet cut pieces 2 are transported, one over the other, in the horizontal direction.

In addition, the other elements of device 1, in particular the two shuttles 11;17, compartmented frames 10, storage units 18;19, and storage device 24 can likewise have a multi-level, preferably two-level, design.

In addition, device 1 preferably has parking places 31 at which compartmented frames 10 can be temporarily parked, filled or unfilled, when they are not in use or are in a waiting position.

The presence of the additional storage device 24 and/or of two-level run-in segment 25, and/or the two-level design of the other elements of device 1 and/or of parking places 31, is of course possible in all specific embodiments of device 1.

In the following, the production method according to the present invention and the sorting method according to the present invention, using devices 1;4 according to the present invention, are explained in more detail.

In the respective cutting installation 3a;b, the glass raw sheets, preferably made of laminated glass or float glass, are cut or divided into individual glass sheet cut pieces 2 in a known manner. The cut glass sheet cut pieces 2 are then brought from their horizontal position into an at least substantially vertical position by tilting table 6. Using conveying means 7, the upright glass sheet cut piece 2 is conveyed to receiving and transfer shuttle 11 of receiving station 8, where it is taken over by receiving and transfer shuttle 11.

Depending on how many compartments receiving and transfer shuttle 11 comprises, it can accommodate one or more glass sheet cut pieces 2.

Receiving and transfer shuttle 11 now moves the received glass sheet cut piece or pieces 2 to one of the available, waiting compartmented frames 10 of receiving station 8, and transfers the glass sheet cut piece or pieces 2 to compartmented frame 10. The filling of compartmented frames 10 here takes place without sorting; that is, compartmented frames 10 are sequentially filled with glass sheet cut pieces 2 in the sequence in which glass sheet cut pieces 2 arrive from the cutting, without a sorting taking place. Compartmented frames 10 are thus filled with glass sheet cut pieces 2 in a random (cut piece) sequence.

The sequence of glass sheet cut pieces 2, i.e. in which compartment of which compartmented frame 10 which glass sheet cut piece 2 is situated, is stored during this, preferably in automated fashion.

Here, glass sheet cut pieces 2 can also be rotated by 180° by receiving and transfer shuttle 11, so that for example the layer side changes. For this purpose, the upper part of receiving and transfer shuttle 11 is rotatable about a vertical axis in a known manner.

Subsequently, compartmented frames 10, filled in a random sequence with the unsorted glass sheet cut pieces 2, is transported to sorting station 9, either manually or controlled in automated fashion. In the case of automated transporting, corresponding drive and control means are provided for the transport vehicles or harp racks. There, compartmented frames 10 are queued into first and/or second compartmented frame row 15;16 of sorting station 9.

The automated resorting by sorting shuttle 17 of the unsorted glass sheet cut pieces 2, 8 now takes place. Glass sheet cut pieces 2 are sorted from the compartmented frames 10, filled with the unsorted glass sheet cut pieces 2, into other, or further, harp racks 10 of first or second compartmented frame row 15;16, in the sequence and combination required for the subsequent process. The sorting filling of compartmented frames 10 here takes place without movement of the compartmented frames 10 of the first and second compartmented frame row 15;16. Only sorting shuttle 17 moves for this purpose.

In the second specific embodiment, having only one compartmented frame row 15, glass sheet cut pieces 2 are sorted from compartmented frames 10, filled with the unsorted glass sheet cut pieces 2, into further, or other, compartmented frames 10 of the same compartmented frame row 15. The further, or other, compartmented frames 10 can also be compartmented frames 10 that were previously likewise filled with unsorted glass sheet cut pieces 2, or are still filled therewith.

Glass sheet cut pieces 2 can in turn also be rotated by 180° by sorting shuttle 17, so that e.g. the layer side changes. For this purpose, the upper part of sorting shuttle 17 is rotatable about a vertical axis in a known manner.

The sorted sequence of glass sheet cut pieces 2, i.e. in which compartment of which compartmented frame 10 which glass sheet cut piece 2 is situated, is here again stored, preferably in automated fashion.

In addition, compartmented frames 10 having glass sheet cut pieces 2 from processes other than the cutting process, e.g. having glass sheet cut pieces 2 from tempering device 22*b*, can also be queued in unsorted fashion into the first or second compartmented frame row 15;16 of sorting station 4, and glass sheet cut pieces 2 contained therein can be sorted into a different compartmented frame 10 of sorting station 4.

In addition, glass sheet cut pieces 2 can also be stored, or temporarily stored, in the two stationary storage units 18;19 if they are not needed until later.

From sorting station 4, compartmented frames 10, filled with glass sheet cut pieces 2 sorted in the production sequence, can then be transported to the respective further processing installation 5;22*a;b*, where they are then supplied to the respective process in the production sequence. The transporting of compartmented frames 10 again takes place manually, or preferably controlled in automated fashion. In the case of automated transport, corresponding drive and control means are provided.

In the respective further processing installation 5;22*a;b*, glass sheet cut pieces 2 are removed from harp racks 10, for example by a stationary transfer device 23. Transfer device 23 can comprise grippers or other means for this purpose. And, for the removal, harp racks 10 are moved past transfer device 23.

Figure 3:
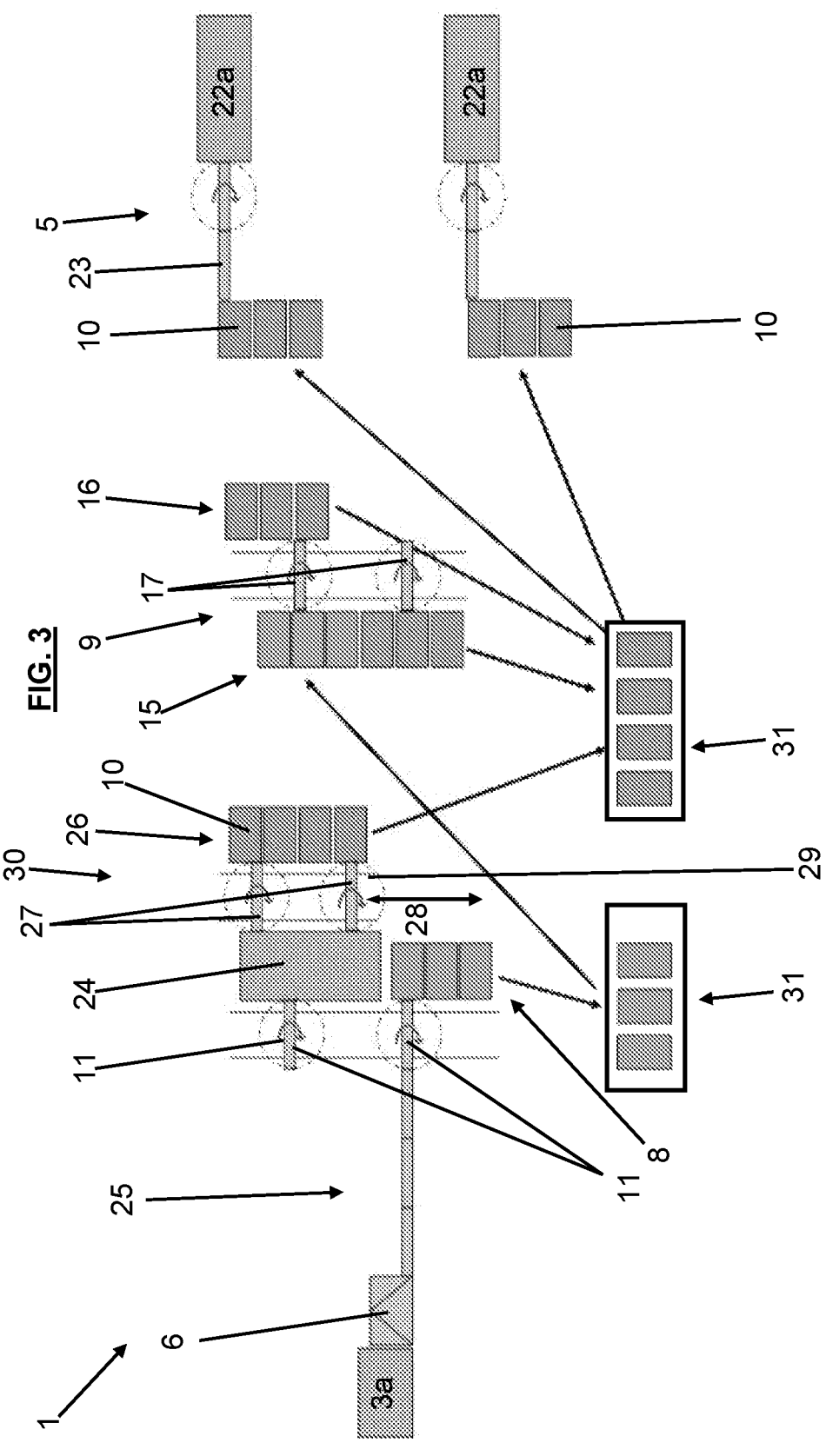
FIG. 3 shows a highly simplified and schematic top view of a device according to the present invention in a further specific embodiment, having an additional stationary storage device.

In the further specific embodiment of the present invention according to FIG. 3, before receiving station 8 glass sheet cut pieces 2 run through the multi-level, preferably two-level, run-in segment 25.

In run-in segment 25, a portion of the glass sheet cut pieces 2 are lifted into the upper level or levels, and are further transported there, and the other portion is transported below. From run-in segment 25, glass sheet cut pieces 2 are conveyed in the order in which they come from run-in segment 25, in a random sequence, into multi-level compartmented frames 10 by multi-level receiving and transfer shuttle 11.

In addition, according to the further specific embodiment, as explained above, stationary storage device 24 is provided. A portion of the glass sheet cut pieces 2 can also be conveyed into this storage device in a random sequence by receiving and transfer shuttle 11. These glass sheet cut pieces 2 are then sorted into the compartmented frames 10 of the further compartmented frame row 26 by further sorting shuttle 27. Analogous to compartmented frames 10 of first sorting station 4, compartmented frames 10 having the sorted glass sheet cut pieces 2 are then transported to further processing installation 5;22*a;b*.

An advantage of the present invention is, inter alia, that the movable compartmented frames 10 are mobile, spatially decoupled intermediate storage units, and represent a significantly simpler solution than large, stationary intermediate storage units.

In addition, due to receiving station 8 situated before sorting station 9 an additional buffer is provided, so that no blocking of one of the stations 8;9 occurs.

In addition, the present invention enables a rapid filling of compartmented frames 10. Long positioning trips are not necessary.

In addition, mobile compartment frames 10 can also be used for processes situated spatially far apart from one another.

Of course, it is also within the scope of the present invention to carry out the filling of glass sheet cut pieces 2 manually, or using a different sorting means, instead of using receiving and transfer shuttle 11.

In addition, it is within the scope of the present invention that a plurality of receiving and transfer shuttles 11, preferably two, and/or a plurality of, preferably two, sorting shuttles 17;27 are provided. The plurality of receiving and transfer shuttles 11, or the plurality of sorting shuttles 17;27, respectively travel on the same track.

The conveying means 7, in particular the buffer conveyor, can also convey not only a single glass sheet cut piece 2, but for example can also convey a plurality of, preferably two, glass sheet cut pieces 2 simultaneously onto receiving and transfer shuttle 11. This also depends in particular on how many glass sheet cut pieces 2 the receiving and transfer shuttle 11 can accommodate alongside one another. In this case, conveyor means 7, in particular the buffer conveyor, has a plurality of, preferably two, compartments situated alongside one another for respectively receiving a glass sheet cut piece 2 or a plurality of glass sheet cut pieces 2 one after another.

If receiving and transfer shuttle 11 and/or sorting shuttle 17;27 can respectively accommodate a plurality of, preferably two, glass sheet cut pieces 2 alongside one another, then, particularly advantageously, a plurality of, preferably two, glass sheet cut pieces 2 can simultaneously respectively be conveyed onto a harp rack 10 by the respective shuttle 11;17;27.

This is advantageous in particular in the case of receiving and transfer shuttle 11. For example, the compartments nos. 1 and 25 of a harp rack 10 of receiving station 8 are then filled first, and compartments 2 and 26 of harp rack 10 are filled subsequently. In this way, the cycle times are significantly reduced.

Of course, it is also possible for more than two glass sheet cut pieces 2 to be simultaneously transferred into a harp rack 10 by the respective shuttle 11;17;27, depending on how many glass sheet cut pieces 2 shuttle 11;17 can accommodate. Preferably, however, shuttles 11;17;27 are realized as double shuttles.

In addition, it is advantageously also possible for a plurality of, preferably two, glass sheet cut pieces 2 to be simultaneously conveyed onto sorting shuttle 17;27 by sorting shuttle 17;27 from a harp rack 10 or from storage device 24.

Transfer device 23 can also be designed such that it can remove a single glass sheet cut piece 2 or a plurality of, preferably two, glass sheet cut pieces 2 adjacent to one another from harp rack 10 simultaneously. For example, transfer device 23 can then remove glass sheet cut pieces 2 first from compartments nos. 1 and 25, and subsequently from compartments 2 and 26, of the respective harp rack 10. In this case, transfer device 23 has a plurality of, preferably two, compartments situated alongside one another for the respective accommodation of a glass sheet cut piece 2, or of a plurality of glass sheet cut pieces 2 one after another.

In addition, it is within the scope of the present invention for glass sheet cut pieces 2 to be additionally purchased glass sheet cut pieces 2. That is, device 1 need not have a cutting installation 3*a;b*, or a portion of glass sheet cut pieces 2 is externally purchased.

In addition, plate-shaped objects other than glass sheet cut pieces 2, in particular plexiglass sheets, ceramic plates, and/or wood plates, can also be sorted using sorting device 4 according to the present invention.

The invention claimed is:

1. A sorting method for sorting plate-shaped elements, having the following method steps:

a) unsortedly, or randomly, filling compartmented frames of a receiving station with the plate-shaped elements, b) transporting the compartmented frames filled with the unsorted plate-shaped elements to a separate sorting station, and queueing the compartmented frames into a sorting station compartmented frame row, c) sorting the plate-shaped elements in the separate sorting station from the compartmented frames filled with the unsorted plate-shaped elements into other compartmented frames of the separate sorting station, using at least one sorting shuttle that travels back and forth outside the compartmented frames parallel to the sorting station compartmented frame row.

2. A sorting device for sorting plate-shaped elements using the sorting method according to claim 1, comprising:

a) the receiving station having the plurality of compartmented frames situated alongside one another in a receiving station compartmented frame row, having the unsorted plate-shaped elements received therein, b) the separate sorting station situated after the receiving station in a processing sequence, the separate sorting station comprising the at least one sorting station compartmented frame row, respectively having the plurality of compartmented frames situated alongside one another, a portion of the compartmented frames being compartmented frames having the unsorted plate-shaped elements from the receiving station received therein, and the separate sorting station comprising the at least one sorting shuttle that is movable back and forth outside the compartmented frames along a fixedly defined track parallel to the sorting station compartmented frame row for the sorting of the unsorted plate-shaped elements from the compartmented frames filled with the unsorted plate-shaped elements into other compartmented frames of the separate sorting station.

3. The sorting device according to claim 2, wherein the sorting device comprises drive and control means for the automated movement of the compartmented frames from the receiving station to the separate sorting station.

4. The sorting device according to claim 2, wherein the separate sorting station comprises a first and a second sorting station compartmented frame row, respectively having a plurality of compartmented frames situated alongside one another, and the sorting shuttle is situated between the first and the second sorting station compartmented frame row.

5. The sorting device according to claim 2, wherein the separate sorting station or the sorting shuttle comprises means with which the plate-shaped elements can be conveyed from the compartmented frames onto the sorting shuttle and from the sorting shuttle into the compartmented frames.

6. The sorting device according to claim 2, wherein the compartmented frames comprise a plurality of compartments for receiving the plate-shaped elements, the plate-shaped elements being situated in the compartments vertically or inclined relative to the vertical.

7. The sorting device according to claim 2, wherein the compartmented frames are harp racks having wheels.

8. The sorting device according to claim 2, wherein the sorting device comprises driverless transport vehicles for moving the compartmented frames.

9. The sorting device according to claim 2, wherein the receiving station comprises at least one receiving and transfer shuttle, situated before the receiving station compartmented frame row in a processing sequence, for respectively receiving at least one plate-shaped element from a cutting installation, and for transferring the plate-shaped element to one of the compartmented frames of the receiving station.

10. The sorting device according to claim 9, wherein the receiving and transfer shuttle is movable back and forth parallel to the receiving station compartmented frame row in a horizontal shuttle conveying direction on a fixed track.

11. The sorting device according to claim 9, wherein the receiving and transfer shuttle comprises means with which a plate-shaped element can be conveyed onto the receiving and transfer shuttle and from the receiving and transfer shuttle into the compartmented frames.

12. The sorting device according to claim 9, wherein the sorting shuttle and/or the receiving and transfer shuttle respectively comprises at most 10 compartments for receiving the plate-shaped elements.

13. The sorting device according to claim 12, wherein the sorting shuttle and/or the receiving and transfer shuttle respectively comprise only a single compartment, or only two compartments, for receiving the plate-shaped elements.

14. The sorting device according to claim 9, wherein the plate-shaped elements are situated in the sorting shuttle and/or in the receiving and transfer shuttle vertically or inclined relative to the vertical.

15. The sorting device according to claim 9, wherein the receiving station, or the receiving and transfer shuttle and the compartmented frames, and/or the separate sorting station, or the sorting shuttle and the compartmented frames, are fashioned having multiple levels.

16. The sorting device according to claim 9, wherein the sorting shuttle and/or the receiving and transfer shuttle comprises an upper part that is rotatable about a vertical axis, so that the plate-shaped elements are rotatable by 180° by the shuttle.

17. The sorting device according to claim 9, wherein plate-shaped elements in the form of glass sheet cut pieces are sorted, the sorting device having at least one cutting installation for cutting glass raw sheets into the individual glass sheet cut pieces, wherein the sorting station is situated after the cutting installation for sorting the glass sheet cut pieces, and having at least one further processing installation for the further processing of the sorted glass sheet cut pieces.

18. The sorting device according to claim 17, wherein the further processing installation is an insulating glass production line for the further processing of glass sheet cut pieces made of insulating glass, and/or is a tempering device for tempering glass sheet cut pieces made of float glass, and/or is a device for edge processing.

19. The sorting device according to claim 17, wherein the sorting device comprises drive and control means for the automated transporting of the compartmented frames from the separate sorting station to the respective further processing installation.

20. The sorting device according to claim 17, wherein the sorting device comprises a conveying means situated before the receiving station, for transferring an individual glass sheet cut piece or a plurality of glass sheet cut pieces simultaneously to the sorting device or to the receiving and transfer shuttle.

21. The sorting device according to claim 17, wherein the sorting device comprises at least one transfer device, situated after the sorting station, for transferring an individual glass sheet cut piece or a plurality of sorted glass sheet cut pieces simultaneously to the at least one further processing installation.

22. The sorting device according to claim 17, wherein the sorting device comprises a multilevel run-in segment in which the glass sheet cut pieces are conveyed in multiple levels to the receiving station.

23. The sorting device according to claim 2, wherein the receiving station comprises a stationary storage device that is situated next to the receiving station compartmented frame row, so that the plate-shaped elements can alternatively be transferred to the storage device.

24. A sorting device for sorting plate-shaped elements using the sorting method according to claim 1, comprising:
   a) the receiving station having the plurality of compartmented frames situated alongside one another in a receiving station compartmented frame row, having the unsorted plate-shaped elements received therein,
   b) the separate sorting station situated after the receiving station in a processing sequence,
   the separate sorting station comprising the at least one sorting station compartmented frame row, respectively having the plurality of compartmented frames situated alongside one another, a portion of the compartmented frames being compartmented frames having the unsorted plate-shaped elements from the receiving station received therein, and the separate sorting station comprising the at least one sorting shuttle that is movable back and forth along a fixedly defined track parallel to the sorting station compartmented frame row for the sorting of the unsorted plate-shaped elements from the compartmented frames filled with the unsorted plate-shaped elements into other compartmented frames of the separate sorting station;
   wherein the receiving station comprises a stationary storage device that is situated next to the receiving station compartmented frame row, so that the plate-shaped elements can alternatively be transferred to the storage device,
   wherein the sorting device comprises a further sorting station that comprises at least one further sorting station compartmented frame row respectively having a plurality of compartmented frames situated alongside one another, and the further sorting station comprising at least one further sorting shuttle that is movable back and forth along a fixedly defined track parallel to the further sorting station compartmented frame row for the sorting of the unsorted plate-shaped elements from the storage device filled with the unsorted plate-shaped elements into the compartmented frames of the further sorting station.

25. The sorting method according to claim 1, wherein the sorting of the plate-shaped elements into the compartmented frames takes place in automated fashion, controlled by the sorting shuttle traveling in automated fashion.

26. The sorting method according to claim 1, wherein the sorting comprises respectively conveying the unsorted plate-shaped elements from a compartmented frame filled with the unsorted plate-shaped elements onto the sorting shuttle, transporting the unsorted plate-shaped elements by the sorting shuttle to one of the further compartmented frames, and subsequently sorting the unsorted plate-shaped elements from the sorting shuttle into the further compartmented frame.

27. The sorting method according to claim 1, comprising providing the compartmented frames of the separate sorting station such that they cannot be moved for the sorting of the plate-shaped elements into the compartmented frames.

28. The sorting method according to claim 1, comprising filling the compartmented frames in the receiving station with the plate-shaped elements in a random sequence.

29. The sorting method according to claim 1, comprising transporting the compartmented frames filled with the sorted plate-shaped elements to a further processing installation.

30. The sorting method according to claim 1, comprising filling a compartmented frame respectively with a plurality of plate-shaped elements simultaneously by a receiving and transfer shuttle and/or the sorting shuttle.

31. The sorting method according to claim 30, wherein plate-shaped elements in the form of glass sheet cut pieces are sorted, the method further comprising dividing glass raw sheets into the individual glass sheet cut pieces to be sorted, and, subsequent to the sorting of the glass sheet cut pieces, further processing the glass sheet cut pieces.

32. The method according to claim 31, comprising individually transferring the divided glass sheet cut pieces, or simultaneously transferring a plurality of divided glass sheet cut pieces, to the receiving station, or to the receiving and transfer shuttle.

33. The method according to claim 31, comprising individually transferring the sorted glass sheet cut pieces, or simultaneously transferring a plurality of sorted glass sheet cut pieces, to a further processing installation.

34. The sorting method according to claim 1, comprising filling the sorting shuttle from a compartmented frame respectively with a plurality of plate-shaped elements simultaneously.

35. The sorting method according to claim 1, comprising sorting plate-shaped elements in the form of glass sheet cut pieces.

* * * * *